United States Patent
Tateishi et al.

(10) Patent No.: US 7,952,050 B2
(45) Date of Patent: May 31, 2011

(54) DRILLING METHOD AND LASER MACHINING APPARATUS

(75) Inventors: Hidenori Tateishi, Ebina (JP); Masaru Futaana, Ebina (JP); Yuki Saeki, Ebina (JP); Yasunobu Ueno, Ebina (JP)

(73) Assignee: Hitachi Via Mechanics, Ltd., Ebina-shi (JP)

( * ) Notice: Subject to any disclaimer, the term of this patent is extended or adjusted under 35 U.S.C. 154(b) by 787 days.

(21) Appl. No.: 11/843,807

(22) Filed: Aug. 23, 2007

(65) Prior Publication Data
US 2008/0073329 A1  Mar. 27, 2008

(30) Foreign Application Priority Data

Sep. 21, 2006  (JP) ................. 2006-255744

(51) Int. Cl.
*B23K 26/38* (2006.01)
(52) U.S. Cl. ............ 219/121.71; 219/121.7; 219/121.83
(58) Field of Classification Search ............... 219/121.7, 219/121.71, 121.83; 700/166
See application file for complete search history.

(56) References Cited

U.S. PATENT DOCUMENTS
2003/0000927 A1 *  1/2003  Kanaya et al. ............. 219/121.7

FOREIGN PATENT DOCUMENTS
JP  9-11121 A  * 1/1997
JP  9-277140 A  10/1997

OTHER PUBLICATIONS
Machine translation of Japan Patent No. 9-11,121, Jun. 2010.*

* cited by examiner

*Primary Examiner* — Geoffrey S Evans
(74) *Attorney, Agent, or Firm* — Crowell & Moring LLP

(57) ABSTRACT

A drilling method and a laser machining apparatus which can shorten the measuring time of workpiece surface height and improve the machining efficiency in spite of irregularities of about 10-30 μm high in the surface of a table. Surface heights of the table is measured at lattice points in advance. Top surface height at a desired point of the workpiece mounted on the table is measured. Surface height of the point is arithmetically obtained using heights of four points surrounding the point. The difference between the measured height and the arithmetically obtained height is set as the plate thickness of the workpiece. Top surface height of the workpiece at a machining position is regarded as the sum of the plate thickness and the height at that position obtained from the table surface heights.

2 Claims, 3 Drawing Sheets

DRILLING METHOD AND LASER MACHINING APPARATUS

FIELD OF THE INVENTION

The present invention relates to a drilling method and a laser machining apparatus for machining a workpiece in such a manner that a laser beam is converged by a converging lens and the converging lens is positioned at a height so as to image the laser beam at a predetermined distance from the surface of the workpiece.

BACKGROUND OF THE INVENTION

Assume that the surface of a table on which a workpiece is mounted is flat, and the thickness (plate thickness) of the workpiece is substantially uniform. In this case, a measured height of the top surface of the workpiece at a desired position may be regarded as the height of the top surface of the workpiece. When a hole is machined out in the workpiece, the depth of the hole is generally designated on the basis of the surface of the workpiece. Accordingly, if the position (height) of the top surface of the workpiece is determined, a hole which is superior in depth-direction accuracy can be machined out.

There may be a variation in the plate thickness of the workpiece. In this case, the height of the top surface of the workpiece may be measured at every place to be machined. Alternatively the height of the top surface of the workpiece may be measured at a plurality of places, and an average value of the measured values may be regarded as the height of the top surface of the workpiece when the workpiece is machined.

When a hole is machined out with a mechanical drill, a surface height Zn of a workpiece at a place to be drilled is detected, and compared with an average value Zm of surface heights at N positions, which have been drilled immediately before the aforementioned place to be drilled. When the absolute value of the difference (Zn−Zm) is smaller than a predetermined value δ, drilling is performed. When the absolute value is not smaller than the value δ, it is decided that swarf or the like is caught between the workpiece surface and a substrate pressure plate, and the machining is suspended. Drilling is resumed after such a cause is removed (Patent Document 1).

In recent years, lasers have been used as means for machining small-diameter holes. When a hole is machined by use of a laser beam, the outer shape of the laser beam is shaped into a desired shape by an aperture, and converged by a lens so that an image of the aperture is formed, for example, on the surface of a workpiece. In this case, the allowable value for height variation of the image position is not larger than 30 μm.

Patent Document 1: JP-A-9-277140

The time of machining by a laser is an order of milliseconds. It is therefore not practical to measure the height of the surface of a workpiece in every machining time as shown in Patent Document 1. Even when the height of the top surface of the workpiece from the surface of the table is measured only at a plurality of places, the measuring time becomes longer than the machining time. Thus, the total machining time becomes impractically long.

The plate thickness of a workpiece where holes will be machined by a laser is generally substantially uniform. It has been therefore believed that the machining quality will be uniform if the height of the top surface of the workpiece is measured at one place. However, there has occurred a variation in machining quality in spite of the uniform plate thickness of the workpiece.

The present inventors discovered the following fact. That is, there may be irregularities of about 10-30 μm high in the table surface which has been regarded as flat. The height of those irregularities is close to the allowable value for height variation of the image position. Thus, there occurs a deterioration in machining quality.

SUMMARY OF THE INVENTION

An object of the present invention is to provide a drilling method and a laser machining apparatus in which the time to measure the height of the surface of a workpiece can be shorted to improve the machining efficiency even if there are irregularities of 10-30 μm high in the table surface. 7/31

In order to attain the foregoing object, according to a first configuration of the present invention, a drilling method is characterized in that heights of the surface of the table on which the workpiece is to be mounted are measured at lattice points before mounting the workpiece thereon; a height of the top surface of the workpiece mounted on the table is measured at a desired point before machining; the height of the surface of the table at the desired point is obtained by an arithmetic operation using the heights of the surface of the table at four points surrounding the desired point; the difference between the measured height of the top surface of the workpiece and the height of the surface of the table obtained by the arithmetic operation is set as the plate thickness T of the workpiece; and the workpiece is drilled at a machining position while the height of the top surface of the workpiece at the machining position is set as the sum of the plate thickness T and the height of the surface of the table at the machining position obtained by the arithmetic operation using the heights of the surface of the table at four points surrounding the machining position.

According to a second configuration of the present invention, a laser machining apparatus for machining a workpiece with a laser beam converged by a converging lens positioned at a height so as to set the image position of the laser beam at a predetermined distance from the surface of the workpiece is characterized by including a table on which the workpiece is to be mounted; a storage for storing results of measuring heights of the surface of the table at lattice points; a detector for detecting heights of surface points of the table and the workpiece; and an arithmetic unit for obtaining a height of the surface of the table at an arbitrary point by an arithmetic operation; wherein a height of the top surface of the workpiece mounted on the table is measured at a desired point before machining; the height of the surface of the table at the desired point is obtained by the arithmetic operation using the heights of the surface of the table at four points surrounding the desired point; the difference between the measured height of the top surface of the workpiece and the height of the surface of the table obtained by the arithmetic operation is set as the plate thickness of the workpiece; and the converging lens is positioned at a height corresponding to a machining position while the height of the top surface of the workpiece at the machining position is set as the sum of the plate thickness and the height of the surface of the table at the machining position obtained by the arithmetic operation using the height of the surface of the table at four points surrounding the machining position.

There may be irregularities of about 10-30 μm high in the surface of the table. Even in such a case, only if a height of the top surface of the workpiece is measured at a desired place, the height of the top surface of the workpiece at any other place can be estimated accurately. It is therefore possible to improve the machining efficiency without degrading the machining quality.

DETAILED DESCRIPTION OF THE EMBODIMENT

An embodiment of the present invention will be described below with reference to the drawings.

Figure 1:
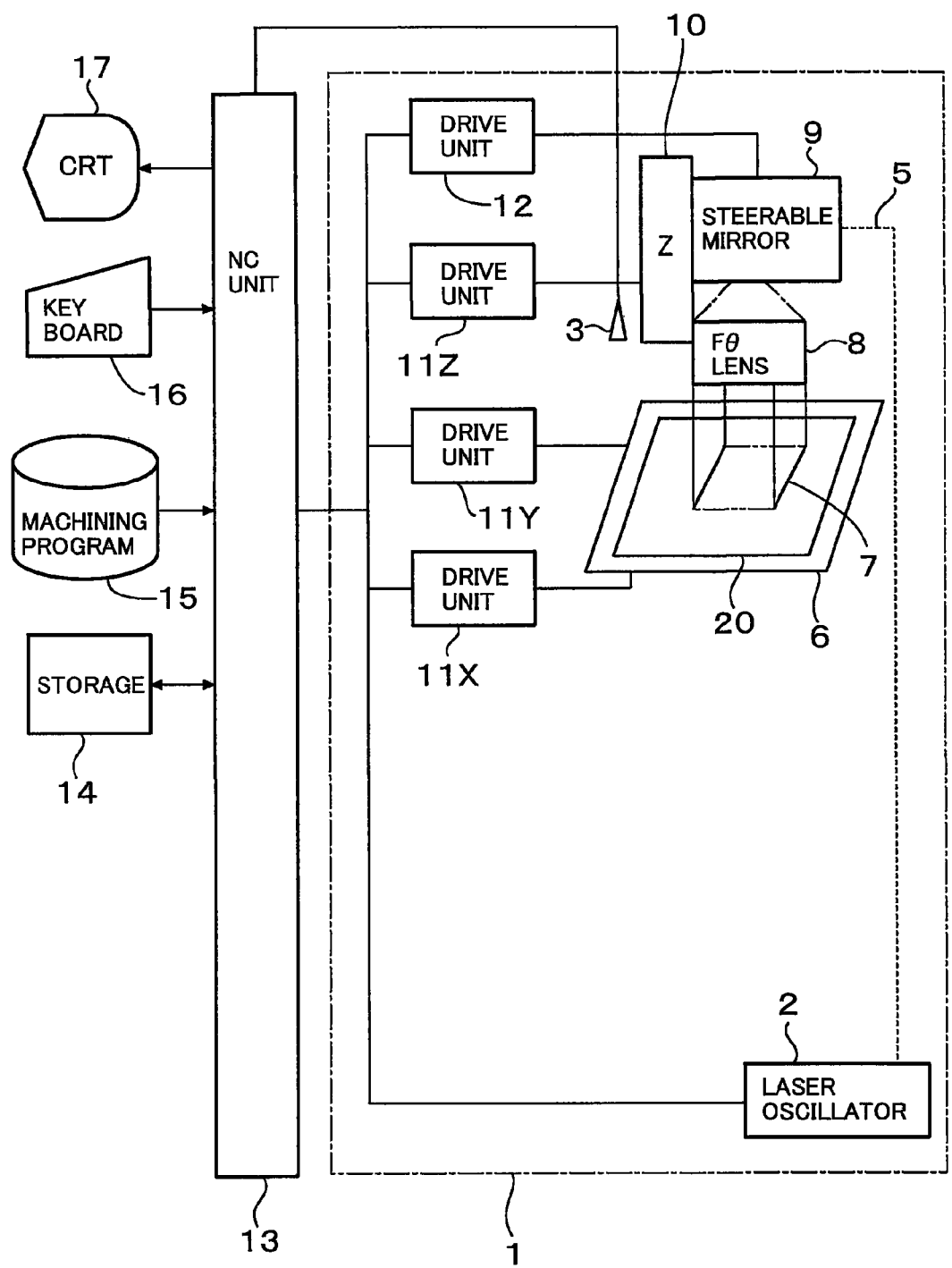
FIG. 1 is a configuration diagram of a laser machining apparatus according to an embodiment of the present invention.

FIG. 1 is a diagram showing a configuration of a laser machining apparatus according to an embodiment of the present invention. In FIG. 1, an X-Y table 6 is disposed on a not-shown base of a laser machining apparatus 1 depicted by a long dashed short dashed line. A printed circuit board 20 is mounted on the X-Y table 6 as a workpiece. The X-Y table 6 can be moved in the X-axis direction and the Y-axis direction by an X-axis drive unit 11X and a Y-axis drive unit 11Y, respectively. The surface of the X-Y table 6 is provided with a large number of small-diameter holes (not shown) connected to a negative pressure source so as to suck the workpiece 20.8/1

A laser oscillator 2, a sensor 3 and an irradiation head 10 are disposed on a not-shown column fixed onto the base. The laser oscillator 2 outputs a laser beam. The sensor 3 measures the position (height) of the top surface of the X-Y table 6 or the top surface of the workpiece 20. The irradiation head 10 can be moved on the column in the Z-axis direction perpendicular to the X-Y table 6 by a Z-axis drive unit 11Z. A pair of steerable mirrors 9, an fθ lens 8, a drive unit 12, etc. are disposed on the irradiation head 10. By the steerable mirrors 9, a pulsed laser beam 5 output from the laser oscillator 2 is positioned at a desired position within a scan area 7 shown by the dashed double-dotted line. The fθ lens 8 converges and positions the laser beam 5, whereas the optical axis of the laser beam 5 is perpendicular to the workpiece. The drive unit 12 rocks the steerable mirrors 9.

An NC unit 13 supplies a predetermined control signal to the laser machining apparatus 1 based on inputs from a machining program 15 and a keyboard 16. In the machining program 15, required data such as coordinates of positions to be machined in the printed circuit board have been described. A storage 14 connected to the NC unit 13 stores required items, and a CRT 17 displays input data, machining condition, etc.

Next, an operation of the present invention will be described.

Figure 2:
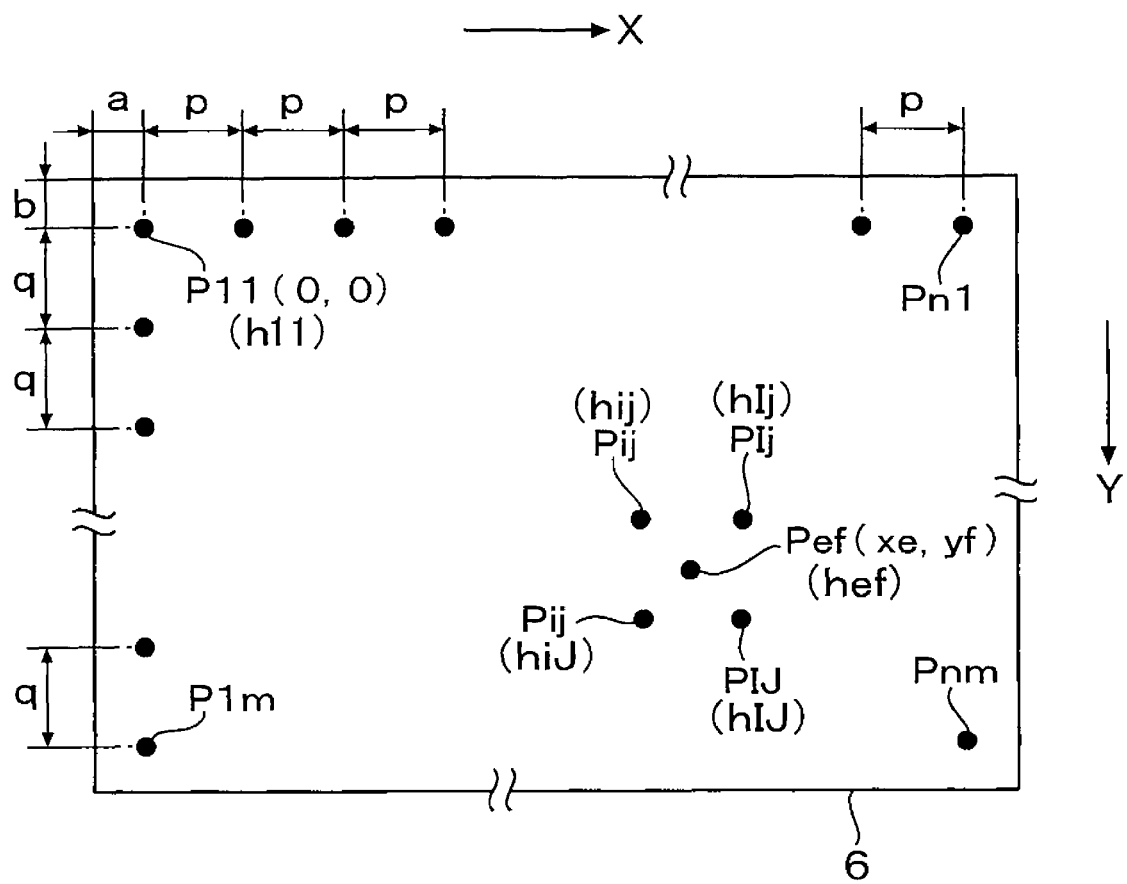
FIG. 2 is a plan view of an X-Y table.

FIG. 2 is a plan view of an X-Y table 6.

According to the present invention, prior to machining, the height from a reference surface (for example, floor surface) (hereinafter referred to as "height" simply) of the surface of the X-Y table 6 where the workpiece will be mounted is measured in advance, and each obtained result is stored in the storage 24 together with the XY coordinates of the point (position) where the obtained result has been measured.

In the illustrated case, the coordinates of a point P11 located at distances a and b from the left edge and the upper edge of the X-Y table 6, respectively, are set as the origin (0, 0) of the X-Y table 6. The X-coordinate xi and the Y-coordinate yj of a lattice point Pij located in a lattice of n horizontal lines arranged at a pitch p in the illustrated left/right X-direction and m vertical lines arranged at a pitch q in the illustrated up/down Y-direction are paired with the height hij and stored. The relations $1 \leq i \leq n$ and $1 \leq j \leq m$ are established in the integers i and j. The pitch p and the pitch q may be made equal to the length (for example, 50 mm) of a side of the scan area 7 depending on the diameter of the fθ lens 8, or may be set as a smaller value (for example, 1 mm). The height hef of an arbitrary point Pef (xe, xf) on the X-Y table 6 is obtained from the four lattice points surrounding the point Pef as:

$$hef=((xI-xe)(yJ-yf)hij+(xI-xe)(yf-yj)hiJ+(xe-xi)(yJ-yf)hIj+(xe-xi)(yf-yj)hIJ)/(xI-xi)(yJ-yj) \quad \text{(Expression 1)}$$

Here, assume that the following relations are established. That is, $i \leq e \leq i+1$, $j \leq f \leq j+1$, $i+1=I$ and $j+1=J$. The four points surrounding the point Pef are Pij, PIj, PiJ and PIJ, and their heights are hij, hIj, hiJ and hIJ respectively.

Next, description will be made about the case where the workpiece 20 having a substantially uniform plate thickness is machined.

The X-coordinate xi and the Y-coordinate yi of any lattice point Pij have been paired with its height hij and stored. In addition, the height of the fθ lens 8 from the reference surface when the irradiation head 10 is put in the moving origin (or standby position) is known in advance. In order to perform machining with high quality, it is necessary to set the distance between the fθ lens 8 and the surface of the workpiece 20 as A, in other words, to position the fθ lens 8 at the height A from the surface of the workpiece 20.8/2

Figure 3:
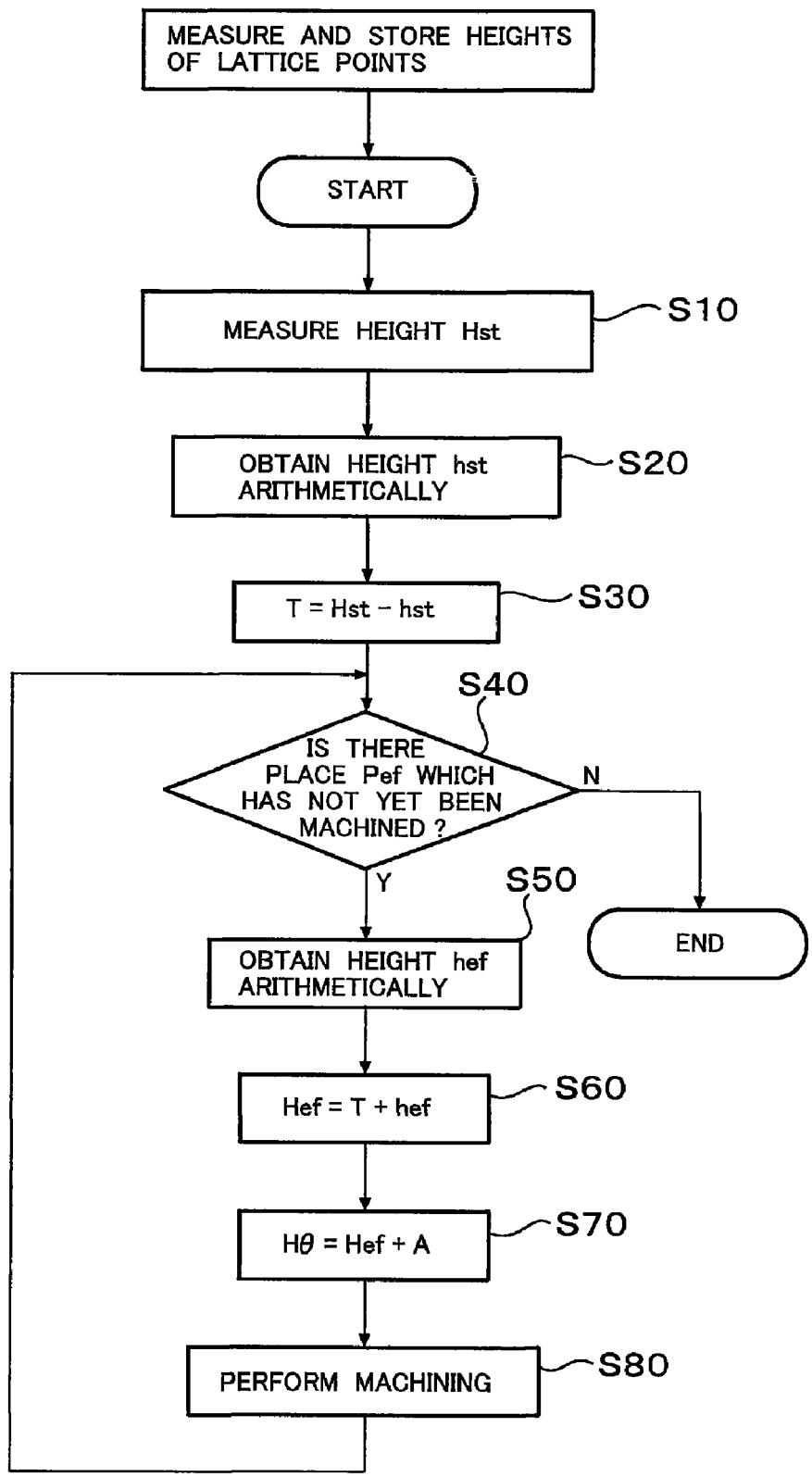
FIG. 3 is a flow chart showing an operation of the present invention.

FIG. 3 is a flow chart showing an operation of the present invention.

Prior to machining, the workpiece 20 is placed on the X-Y table 6, and the negative pressure source is operated to suck the workpiece 20 onto the X-Y table 6. Thus, the workpiece 20 is brought into tight contact with the X-Y table 6.

When a not-shown machining start button is pressed on, with reference to the machining program the NC unit 13 positions the sensor 3 at a desired point (herein a point Pst) where the surface of the workpiece should be measured, and measures the height Hst of the top surface of the workpiece 20 at the point Pst (Step S10). Next, the heights of the four lattice points surrounding the point Pst are assigned into Expression 1 so that the table surface height hst at the point Pst is obtained (Step S20). The obtained result is assigned into:

$$T=Hst-hst \quad \text{(Expression 2)}$$

Thus, the plate thickness T of the workpiece 20 is obtained (Step S30).

Next, it is confirmed whether there is a machining position Pef which has not yet been machined (Step S40). When there is a machining position Pef which has not yet been machined, processing is performed in Step S50. Otherwise processing is terminated. In Step S50, the height hef of the machining position Pef which has not yet been machined is obtained by the arithmetic operation, and the surface height Hef of the workpiece 20 is obtained (Step S60) by calculating Expression 3:

$$Hef=T+hef \quad \text{(Expression 3)}$$

The fθ lens is positioned at the height Hθ (Hθ=Hef+A) (Step S70), and machining is performed (Step S80). After that, processing is performed in Step S40.

As a result, in any position of the workpiece 20, the image position is positioned at a predetermined position (for example, on the surface) from the top surface of the workpiece 20. Thus, high-quality holes can be machined out.

As has been described above, according to this embodiment, the top surface of the X-Y table 6 is measured at lattice points in advance. Thus, machining can be performed with high quality in any position of the workpiece 20 only if the plate thickness T of the workpiece 20 is measured once. In addition, the machining time can be shortened.

The present invention is not limited to a laser machining apparatus. For example, the present invention can be also applied to a mechanical drilling apparatus with a drill.

The invention claimed is:

1. A drilling method comprising the steps of:
   measuring heights of a surface of a table on which a workpiece is to be mounted, from a predetermined reference surface, at lattice points before mounting the workpiece thereon, and storing the measured heights of the surface of the table at the lattice points;
   measuring height at a desired point of a top surface of the workpiece, mounted on the table and having a uniform plate thickness, before machining;
   obtaining the height of the surface of the table at the desired point by an arithmetic operation using the heights of the surface of the table at four lattice points of a minimum unit surrounding the desired point;
   setting the difference between the measured height of the top surface of the workpiece at the point, and the height of the surface of the table obtained by the arithmetic operation, as the plate thickness of the workpiece;
   setting the height of the top surface of the workpiece at another machining position as the heights with the plate thickness added to the heights of the surface of the table at the machining position obtained by the arithmetic operation using the heights of the surface of the table at four minimum lattice points surrounding the other machining position; and
   drilling the other machining position.

2. A laser machining apparatus for machining a workpiece with a laser beam, comprising:
   a converging lens for condensing the laser beam, the converging lens being positioned by a positioning apparatus at a height so as to set an image position of the laser beam at a predetermined distance from a surface of the workpiece;
   a measurement unit for measuring heights of a surface of a table on which the workpiece is to be mounted from a predetermined reference surface, at lattice points before mounting the workpiece thereon, and measuring the measured heights of the surface of the table at the lattice points and the height at an arbitrary point of the top surface of the workpiece mounted on the table and having a uniform plate thickness from the reference surface;
   a storage unit for storing the heights of the surface of the table at the lattice points measured by the measurement unit; and
   an arithmetic unit for obtaining a height of the surface of the table corresponding to the arbitrary point by an arithmetic operation using the height of the surface of the table at four lattice points of a minimum unit surrounding the arbitrary point, stored in the storage unit; wherein the positioning apparatus is configured in such a manner that:
   a difference between the height of the top surface of the workpiece at the arbitrary point and the height of the surface of the table obtained, by the arithmetic unit, corresponding to the desired point, and is set as the plate thickness of the workpiece;
   a value with the plate thickness added to the height of the table at the other machining position obtained by the arithmetic unit based on the height of the table at the lattice points stored in the storage unit is set as the height of the top surface of the workpiece at another machining position; and
   the converging lens is positioned at a height with respect to the top surface of the workpiece at the other machining position.

* * * * *